US012323659B2

(12) United States Patent
Pleshivtsev et al.

(10) Patent No.: US 12,323,659 B2
(45) Date of Patent: Jun. 3, 2025

(54) METHOD AND SYSTEM FOR DISPLAYING VIDEO CONTENT

(71) Applicant: YANDEX EUROPE AG, Lucerne (CH)

(72) Inventors: Kirill Nikolaevich Pleshivtsev, Novosibirsk (RU); Sergey Sergeevich Abbakumov, Novosibirsk (RU); Ramil Rashitovich Gabdrakhmanov, Kazan (RU); Konstantin Yurevich Petryaev, Krasnoyarsk (RU)

(73) Assignee: Y.E. Hub Armenia LLC, Yerevan (AM)

( * ) Notice: Subject to any disclaimer, the term of this patent is extended or adjusted under 35 U.S.C. 154(b) by 155 days.

(21) Appl. No.: 18/079,959

(22) Filed: Dec. 13, 2022

(65) Prior Publication Data

US 2023/0209136 A1 Jun. 29, 2023

(30) Foreign Application Priority Data

Dec. 23, 2021 (RU) ........................... RU2021138529

(51) Int. Cl.
*H04N 21/443* (2011.01)
*G11B 27/00* (2006.01)
*G11B 27/34* (2006.01)

(52) U.S. Cl.
CPC ....... *H04N 21/4431* (2013.01); *G11B 27/005* (2013.01); *G11B 27/34* (2013.01)

(58) Field of Classification Search
CPC ... H04N 21/4431; G11B 27/005; G11B 27/34
See application file for complete search history.

(56) References Cited

U.S. PATENT DOCUMENTS 8,874,469 B2 10/2014 Smith et al.
2002/0133247 A1 9/2002 Smith et al.
(Continued)

FOREIGN PATENT DOCUMENTS

| CN | 108810572 A | 11/2018 |
| KR | 20180086112 A | 7/2018 |
| RU | 2679562 C1 | 2/2019 |

OTHER PUBLICATIONS

Online article entitled "Media Source Extensions ™", Published on Sep. 30, 2021, https://www.w3.org/TR/2021/WD-media-source-2-20210930/.
(Continued)

*Primary Examiner* — Girumsew Wendmagegn
(74) *Attorney, Agent, or Firm* — BCF LLP

(57) ABSTRACT

A method and an electronic device for switching play between a first video content and a second video content in a web page of a browser application are provided. The method comprises: acquiring a digital document representative of the web page containing a video tag referencing a first source; establishing a first connection between a first video player and the video tag; playing, by the first video player, the first video content from the first source; in response to a trigger event: pausing the playing of the first video content; and establishing a second connection between a second video player and the video tag; playing, by the second video player, the second video content; in response to ending the playing of the second video content: re-establishing the first connection; and resuming the playing of the first video content by the first video player.

19 Claims, 7 Drawing Sheets

(56) References Cited

U.S. PATENT DOCUMENTS

| | | |
|---|---|---|
| 2009/0222332 A1 | 9/2009 | Smith et al. |
| 2010/0275221 A1 | 10/2010 | Duvall et al. |
| 2012/0066289 A1* | 3/2012 | Bland ................... H04L 67/141 |
| | | 709/203 |
| 2013/0276041 A1 | 10/2013 | Dutta |
| 2015/0074713 A1 | 3/2015 | Karaoguz et al. |
| 2017/0142496 A1 | 5/2017 | Malhotra et al. |
| 2020/0007643 A1 | 1/2020 | Vysotsky et al. |
| 2020/0304868 A1* | 9/2020 | Ganjam ............. H04N 21/4425 |
| 2021/0034227 A1 | 2/2021 | Persson et al. |

OTHER PUBLICATIONS

Russian Search Report dated Nov. 30, 2023 issued in respect of the counterpart Russian Patent Application No. RU 2021138529.

\* cited by examiner

METHOD AND SYSTEM FOR DISPLAYING VIDEO CONTENT

CROSS-REFERENCE

The present application claims priority to Russian Patent Application No. 2021138529, entitled "Method and System for Displaying Video Content", filed Dec. 23, 2021, the entirety of which is incorporated herein by reference.

FIELD

The present technology relates generally to video display; and in particular, to a method of switching between different types of video content displayed online in a web page.

BACKGROUND

When a user is watching a video online, such as a video clip or a film (referred to herein as "principal video"), for example, at a video hosting platform, a social network, or any other web resource offering online video services, he or she can be provided with an auxiliary video message via a same video frame as the principal video. There are certain approaches to delivering such auxiliary video messages. For example, displaying a given auxiliary video message may be caused in response to a predetermined trigger event, such as at a predetermined moment during the display of the principal video.

Conventionally, display of the principal video may include detecting, by a browser application running on an electronic device of the user, a video tag in an HTML source code of the web page, determining therein a source of the principal video, and causing downloading therefrom encoded video data (which is also referred to herein as "buffering") associated with the principal video. Further, the browser application may cause an associated video player (such as a built-in video player) to decode the so downloaded video data, and using an Application Programming Interface (API), cause display of a respective portion the principal video.

While displaying the principal video, in response to the trigger event, the browser application may be caused, such as by a video manager application associated therewith, to pause the display of the principal video and interrupt downloading the encoded video data associated with further portions of the principal video to display, via the same video player, the auxiliary video message. Once the display of the auxiliary video message has been completed, the browser application may further be configured to restore the connection with the source of the principal video to resume the downloading the encoded video data associated with the further portions thereof for display thereof at the moment when it was paused.

However, such an approach to displaying the auxiliary video message may affect user experience of the end user with watching the principal video. More specifically, restoring the connection and downloading sufficient encoded video data for resuming the display of the principal video may cause a delay (lasting, for example, several seconds) appreciable by the end user.

Certain prior art approaches have been proposed to tackle the above-identified technical problem.

U.S. Pat. No. 8,874,469-B2 issued on Oct. 28, 2014, assigned to Microsoft Technology Licensing LLC, and entitled "GLITCH FREE DYNAMIC VIDEO AD INSERTION" discloses techniques for dynamically and seamlessly inserting secondary content via a second video pipeline into the playing of principal content over a first video pipeline.

SUMMARY

Therefore, there is a need for systems and methods which avoid, reduce or overcome the limitations of the prior art.

Developers of the present technology have appreciated that the delay caused by switching between the auxiliary video message and the principal video may be reduced to a level inappreciable by the end user if each one thereof is displayed by a respective separate video player. More specifically, the developers have devised methods of temporarily assigning each of the separate video players to the video tag of the HTML source code of the web page the end user is currently browsing to watch the principle video.

Thus, when the display of the auxiliary video message is caused, the browser is caused to "detach" a first video player displaying the principal video from the video tag of the HTML source code of the web page, and "attach" thereto a second video player playing back the auxiliary video message. By so doing, the principal video continues getting buffered while the auxiliary video message being displayed by the second video player, which may further allow resuming the display of the principal video without an appreciable pause after switching from the auxiliary video message.

Therefore, the present methods and systems allow improving user experience of end users watching online videos having, for example, commercial cut-ins.

Also, due to using separate video players enabling unbreakable buffering of the principle video, the present methods and systems allow seamlessly switching between the display of the principle video and the auxiliary video message without spending additional computational resources on re-initializing the principle video after the auxiliary video message has ended.

More specifically, in accordance with a first broad aspect of the present technology, there is provided a method of switching play between a first video content and a second video content. The method is executable by an electronic device running a browser application. The method comprises: acquiring a digital document representative of a web page, the digital document containing a video tag referencing a first video content source; establishing a first connection between a first video player and the video tag using an Application Programming Interface (API); playing, by the first video player, the first video content from the first video content source; in response to a trigger event: pausing the playing of the first video content by the first video player, the first video content being paused at a current moment in time in the first video content; and establishing a second connection between a second video player and the video tag using the API; the second video player being different from the first video player; playing, by the second video player, the second video content; in response to ending the playing of the second video content: re-establishing the first connection between the first video player and the video tag using the API; and resuming the playing of the first video content by the first video player at the current moment in time in the first video content.

In some implementations of the method, the resuming is executed without an appreciable pause to a user.

In some implementations of the method, the method comprises parsing the digital document for detecting the video tag.

In some implementations of the method, the method further comprises: downloading first encoded video content from the first video content source; and decoding, by the first video player, the first encoded video content into the first video content.

In some implementations of the method, the trigger event corresponds to the browser application receiving a command for triggering the playing of the second video content.

In some implementations of the method, the command is embedded in the first video content.

In some implementations of the method, the method further comprises: continuing the downloading and the decoding of the first encoded video content during the playing of the second video content.

In some implementations of the method, the browser application has a browser memory, and wherein the method further comprises: storing in the browser memory the first video content during the playing of the second video content.

In some implementations of the method, prior to the establishing the second connection between the second video player and the video tag, the method further comprises modifying the video tag to reference a second video content source associated with the second video content.

In some implementations of the method, the API is a single API for establishing both the first connection and the second connection.

In some implementations of the method, the API is provided by an operating system run on the electronic device.

In accordance with a second broad aspect of the present technology, there is provided an electronic device for switching play between a first video content and a second video content in a web page of a browser application of the electronic device. The electronic device comprises: a processor; a non-transitory computer-readable medium storing instructions. The processor, upon executing the instructions, is configured to: acquire a digital document representative of the web page, the digital document containing a video tag referencing a first video content source; establish a first connection between a first video player and the video tag using an Application Programming Interface (API); cause playing, by the first video player, the first video content from the first video content source; in response to a trigger event: cause pausing the playing of the first video content by the first video player, the first video content being paused at a current moment in time in the first video content; and establish a second connection between a second video player and the video tag using the API; the second video player being different from the first video player; cause playing, by the second video player, the second video content; in response to ending the playing of the second video content: re-establish the first connection between the first video player and the video tag using the API; and resume the playing of the first video content by the first video player at the current moment in time in the first video content.

In some implementations of the electronic device, the processor is configured to resume the playing of the first video content without an appreciable pause to a user.

In some implementations of the electronic device, to detect the video tag, the processor is configured to parse the digital document.

In some implementations of the electronic device, the processor is further configured to: download first encoded video content from the first video content source; and decode, by the first video player, the first encoded video content into the first video content.

In some implementations of the electronic device, the trigger event corresponds to the browser application receiving a command for triggering the playing of the second video content.

In some implementations of the electronic device, the processor is further configured to: continue downloading and decoding the first encoded video content during the playing of the second video content.

In some implementations of the electronic device, the browser application has a browser memory, and wherein the processor is further configured to: store, in the browser memory, the first video content during the playing of the second video content.

In some implementations of the electronic device, to establish the second connection between the second video player and the video tag, the processor is configured to modify the video tag to reference a second video content source of the second video content.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
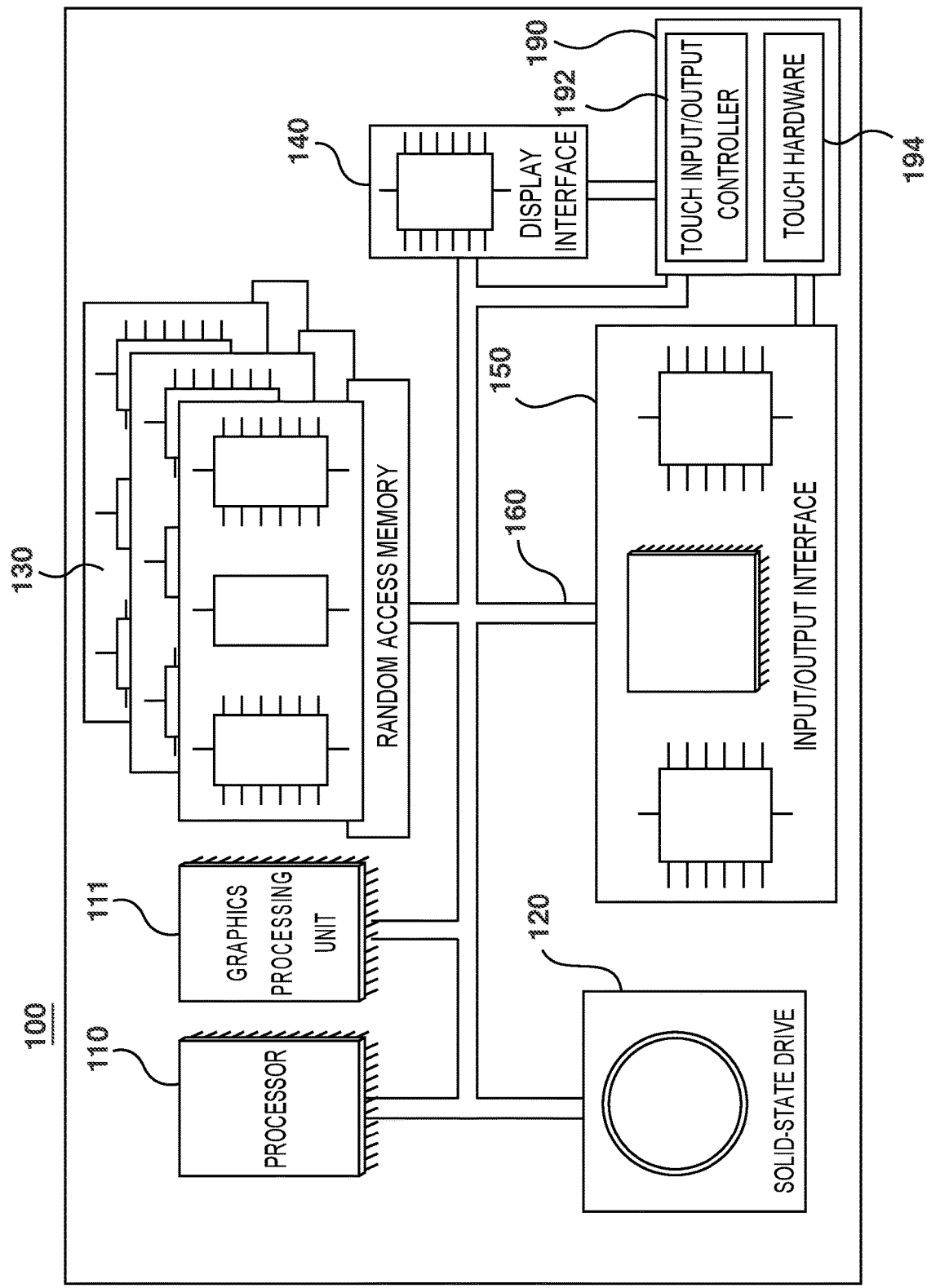
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may equally be referred to as a screen—such as a screen (not separately labelled) of an electronic device 210 depicted in FIG. 2. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some non-limiting embodiments of the present technology, the input/output interface 150 may be connected to a keyboard (not separately depicted), a mouse (not separately depicted) or a trackpad (not separately depicted) allowing the user to interact with the computer system 100 in addition to or instead of the touchscreen 190.

It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as a smartphone.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
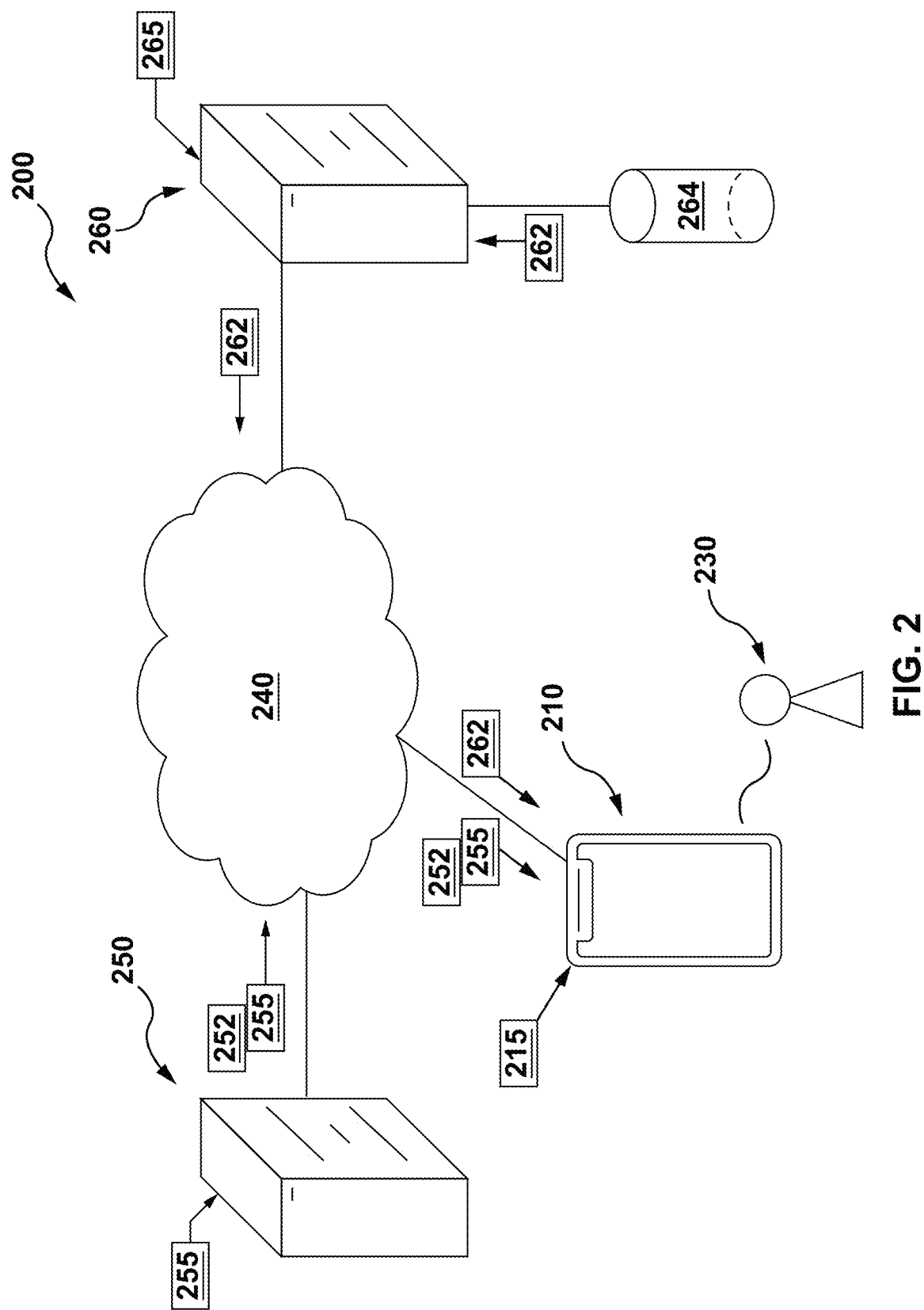
FIG. 2 depicts a schematic diagram of a networked computing environment comprising the computer system of FIG. 1 and being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 communicatively coupled, via a communication network 240, with a server 250. In some non-limiting embodiments of the present technology, the electronic device 210 may be associated with a user 230.

In the non-limiting embodiments of the present technology, the electronic device 210 may be any computer hardware that is capable of running a software appropriate to the relevant task at hand. Thus, some non-limiting examples of the electronic device 210 may include personal computers (desktops, laptops, netbooks, etc.), smartphones, and tablets. Thus, the electronic device 210 may comprise some or all components of the computer system 100 depicted in FIG. 1.

In some non-limiting embodiments of the present technology, the server 250 can be implemented as a conventional computer server and may comprise some or all of the components of the computer system 100 of FIG. 1. In one non-limiting example, the server 250 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 250 is a single server. In alternative non-limiting embodiments of the present technology (not depicted), the functionality of the server 250 may be distributed and may be implemented via multiple servers.

According to some non-limiting embodiments of the present technology, the server 250 can be configured to host a given web resource 255. Broadly speaking, the given web resource 255 may contain and thus provide access to information of various types, such as texts, images, audio, and video organized in at least one web page (such as a given web page 302 depicted in FIG. 3) that is identifiable, in the communication network 240, using, for example, a respective Unique Resource Locator (URL) associated with the at least one page. One of examples of the given web resource 255 may include, without limitation, a web site, such as a commercial web site aimed at promoting certain goods, a social network (such as for example, Facebook.com™), an online video service (for example, Kinopoisk.ru™), and the like.

Thus, in some non-limiting embodiments of the present technology, the user 230, using the electronic device 210, may request access to the given web page 302, such as by submitting the associated URL to an address bar (not depicted in FIG. 2) of a browser application 215 running on the electronic device 210. Further, in response, the server 250 can be configured to grant access to the electronic device 210 to the given web page 302 of the given web resource 255 by transmitting a respective digital document representative thereof to the electronic device 210 for presentation to the user 230.

In the context of the present specification, the browser application 215 is a software application run on an electronic device, such as the electronic device 210, and configured to provide access to resources of nodes of a given network, such as those of the communication network 240, in response to receiving respective network addresses thereof in the given network. In specific non-limiting example, the browser application 215 can be implemented as a Yadex.Browser™ browser application provided by Yandex LLC of Lev Tolstoy Street, No. 16, Moscow, 119021, Russia.

Further, the respective digital document representative of the given web page 302 may comprise an executable source code, such as that developed in HyperText Markup Language (HTML). Thus, having received this digital document, the browser application 215 of the electronic device 210 can be caused to execute the executable source code associated with the given web page 302, thereby rendering a visual representation thereof for presentation to the user 230. It should be noted that the executable source code of the given web page 302 may include portions developed in other programming languages. For example, however, not a limitation, the executable source code may also include portions developed in a JavaScript programming language allowing dynamically manipulating certain elements of the given web page 302 defined by the HTML, as will be described in greater detail below.

In some non-limiting embodiments of the present technology, the given web resource 255 can be configured to provide access to a first video content 252, such as, without limitation, one of a video clip, a video film, and a video streaming, and the given web page 302 may be configured for online display thereof.

Figure 3:
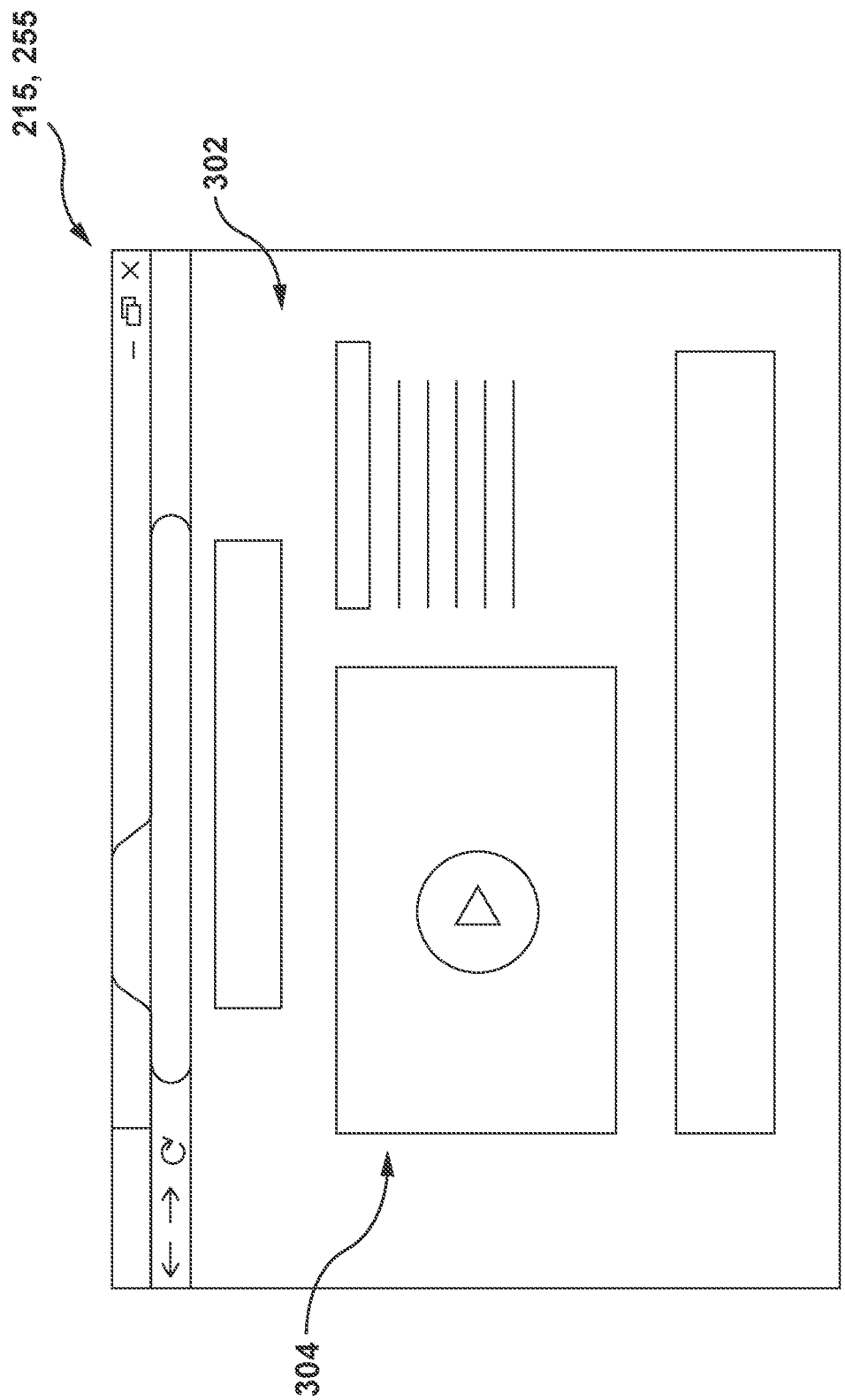
FIG. 3 depicts a schematic diagram of a graphical user interface (GUI) of a browser application run on an electronic device present in the networked computing environment of FIG. 2 and providing a visual representation of a given web page, in accordance with certain non-limiting embodiments of the present technology.

With reference to FIG. 3, there is depicted a graphical user interface of the browser application 215 providing the visual representation of the given web page 302, in accordance with certain non-limiting embodiments of the present technology. As it can be appreciated from FIG. 3, the given web page 302 may define, for example, a video display area 304 (such as a video frame) for displaying therein various video content, such as the first video content 252.

In some non-limiting embodiments of the present technology, to enable the display of the first video content 252 in the video display area of given web page 302, the executable source code associated with the given web page 302 may include a dedicated portion responsible for video content presentation. For example, in the HTML, such a portion is a video tag including attributes specifying respective parameters of display of a given video content, such as the first video content 252. For example, a first attribute (such as a src attribute), may specify a first video content source of the first video content 252 to be displayed, such as its URL defining a path thereto within the communication network 240.

In some non-limiting embodiments of the present technology, the first video content 252 may be hosted by the same server as the given web resource 255, that is, the server 250. However, in other non-limiting embodiments of the present technology, the first video content source may be a third-party server and/or database (not depicted in FIG. 2) communicatively coupled to the communication network 240 and configured to provide video content for the given web resource 255.

Figure 5:
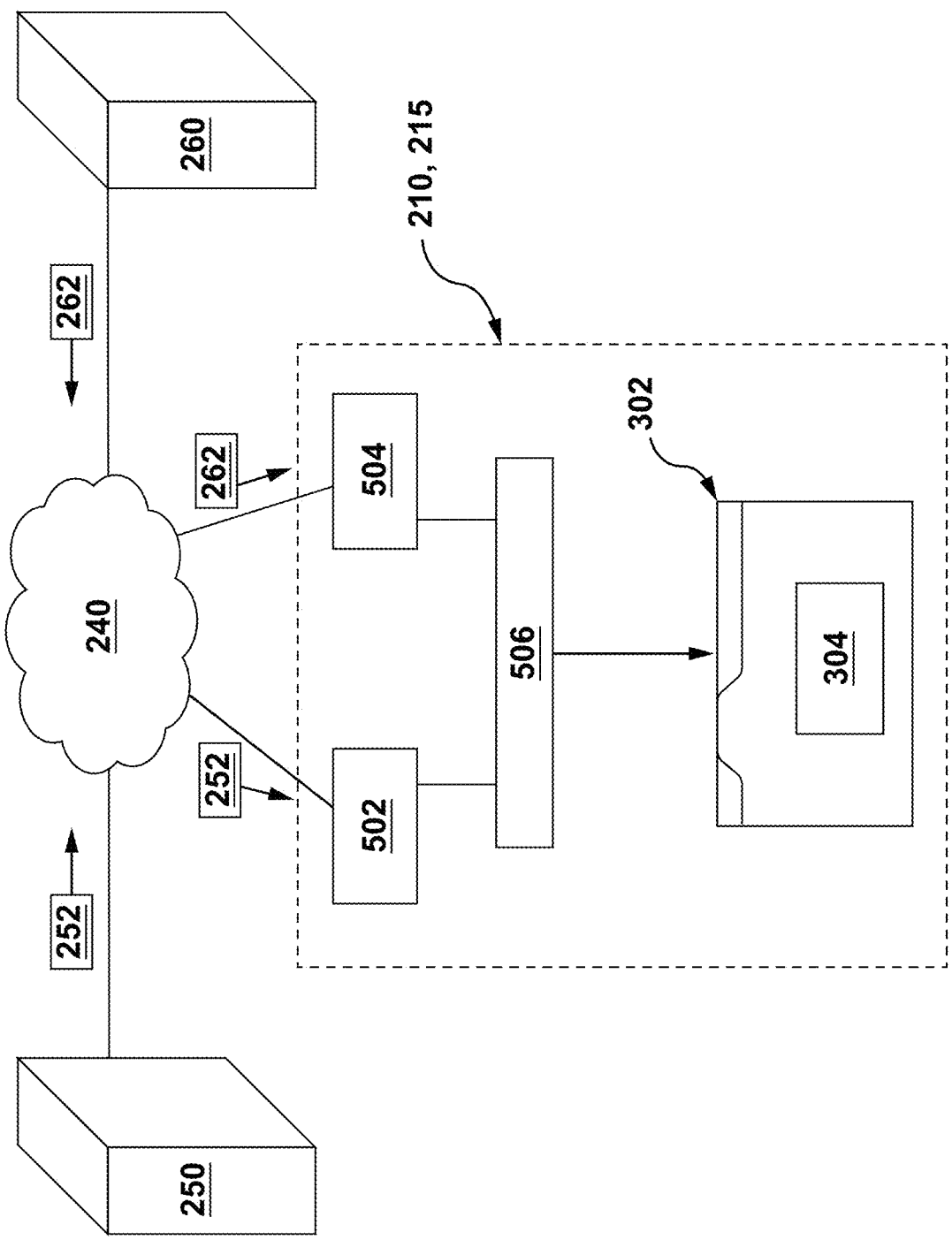
FIG. 5 depicts a schematic diagram of a process of displaying, in the given web page of the browser application, by the electronic device present in the networked computing environment of FIG. 2, the different video contents using respective separate video players, in accordance with certain non-limiting embodiments of the present technology.

Further, a second attribute of the video tag may specify a mode in which the first video content 252 is to be played back. For example, the second attribute may have a value indicative of a command to cause automatic play back of the first video content 252 when the given web page 302 is loaded in the browser application 215, such as an autoplay attribute in the HTML. A third attribute may specify presence of controls as the first video content 252 being displayed within the video display area 304 such as "play", "pause", "next", and "previous", and the like, as an example. Thus, for example, the video tag of the executable source code associated with the given web page 302 developed in the HTML can look as follows:

of the present technology, the browser application 215 may include (or otherwise have access to) a video player, such as a first video player 502 depicted in FIG. 5. In the context of the present specification, the first video player 502 is a software application configurable for displaying digital media content, such as audio and video, of various formats, including, for example, without limitation, MP3, MP4, WebM, Ogg, and the like. Additionally, as the video content transmittable over the communication network 240, such as the first video content 252, may be encoded, such as compressed, as an example, for more efficient transmission thereof, the first video player 502 can further be configured to decode the received first encoded video data associated with the first video content 252, thereby restoring an initial quality thereof for presentation to the user 230.

It is not limited how the first video player 502 associated with the browser application 215 is implemented, and in some non-limiting embodiments of the present technology, the first video player 502 may be built-in the browser application 215, such as be a program extension of the browser application 215 having the above functionality. In other non-limiting embodiments of the present technology, the first video player 502 may be provided by a respective multimedia framework of an operating system running on the electronic device 210 and integrated into the browser application 215 using associated program libraries. For example, in those non-limiting embodiments of the present technology, where the operating system of the electronic device 210 is a Windows' operating system, the first video player 502 may be provided by a Windows Media Foundation™ multimedia framework. In another example, where the operating system of the electronic device 210 is an iOS™ operating system, the first video player 502 may be provided by an AVFoundations™ multimedia framework. In yet another example, where the operating system of the electronic device 210 is an Android™ operating system, the first video player 502 may be provided by a MediaPlayer™ multimedia framework.

Further, according to certain non-limiting embodiments of the present technology, the browser application 215 can be configured to communicate with the first video player 502 via an Application Programming Interface (API). Broadly speaking, a given API (or a set of APIs, such as an API 506 depicted in FIG. 5) is a software intermediary that allows two applications, such as the browser application 215 and the first video player 502, to be in communication with each

```
<html>
    [...]
        <body>
            [....]
                <video src="first video content source" autoplay controls></video>
            [...]
        </body>
    [...]
</html>
```

It should be noted that other attributes defining other respective parameters of the display of the first video content 252 including, for example, those defining dimensions of the video display area 304 or specifying a preview image to be shown before the first video content 252 is displayed, are also envisioned without departing from the scope of the present technology.

Further, to cause display of the first video content 252 referenced in the video tag of the executable source code of the given web page 302, in some non-limiting embodiments other. For example, as will become apparent from the description provided below, using the API 506 of the first video player 502, the browser application 215 can be enabled to establish a connection between the video tag associated with the given web page 302 and the first video player to cause the first video player 502 to receive encoded data associated with the first video content 252 and further decode it for further display thereof. Further, using the API 506, the browser application 215 can be enabled to control the display of the first video content therein 252 by pausing and resuming it at certain moments in time, for example.

In some non-limiting embodiments of the present technology, the API 506 used for connecting the first video player 502 with the browser application 215 can be provided by a same entity as that providing the first video player 502 itself. For example, in those non-limiting embodiments of the present technology, where the first video player 502 is provided by the respective multimedia framework of the operating system running on the electronic device 210, the API 506 can also be provided by the operating system, which can also be referred to herein as "standard APIs". However, in another example where the first video player 502 is built in the browser application 215, the API 506 can be provided as part of the first video player 502.

Further, in some non-limiting embodiments of the present technology, the API 506 can be a single API used by the browser application 215 for causing display video content via the first video player 502. However, in other non-limiting embodiments of the present technology, the browser application 215 can be configured to use different APIs for displaying different respective video content, for example, that received from different sources.

In some non-limiting embodiments of the present technology, an operator of the server 250 hosting the given web resource 255 may allow integration of additional video content into that to which the server 250 provides access, such as the first video content 252. To that end, in accordance with certain non-limiting embodiments of the present technology, also communicatively coupled to the communication network 240 is a second server 260 providing access to a second video content 262 to be displayed within the video display area 304 in the given web page 302 by interrupting the display of the first video content 252. Broadly speaking, the second server 260 may be configured to provide access to various video content, duration, nature, and format of which is not limited. Thus, in some non-limiting embodiments of the present technology, the second server 260 can be implemented substantially similar to the server 250 and comprise some or all the component of the computer system 100 depicted in FIG. 1. However, in other non-limiting embodiments of the present technology, the second video content 262 can be provided by a same server as that providing the first video content 252, that is, the server 250, without departing from the scope of the present technology.

Further, for storing the video content, the second server 260 can be communicatively coupled to a video content database 264. Although the video content database 264 is illustrated in FIG. 2 as coupled to the second server 260 via a direct communication link, in alternative non-limiting embodiments, the video content database 264 may be coupled to the second server 260 via the communication network 240. Further, although in the embodiments depicted in FIG. 2, the video content database 264 is implemented as a single entity, a distributed implementation thereof is also envisioned without departing from the scope of the present technology.

Thus, in certain non-limiting embodiments of the present technology, the given web page 302 can be configured for online displaying, along with the first video content 252, the second video content 262 within the video display area 304. For example, at a given moment in time, the display of the first video content 252 may be paused, and the browser application 215 can be caused to switch from the display of the first video content 252 to the display of the second video content 262. Put it another way, the processor 110 can be configured to cause the browser application 215 to add the display of the second video content 262 at the given moment in time of the display of the first video content 252 by putting it on pause, as will described below.

According to certain non-limiting embodiments of the present technology, the second video content 262 may be a commercial video content, such as that aimed at promoting certain items including various products and/or services, as an example. Thus, the second video content 262 could have been submitted to the second server 260 for adding to other video content, by a respective advertiser. Further, in some non-limiting embodiments of the present technology, for selecting the second video content 262, from the video content database 264, for addition to the first video content 252 and determining other parameters of the display thereof within the first video content 252, such as the given moment for display thereof within the timeline of the latter, the second server 260 can be configured to run a video manager application 265.

Broadly speaking, the video manager application 265, as used herein, is a software application that can be configured to determine which additional video content provided by the second server 260, such as the second video content 262, can be displayed during the interruption of the video content available from the given web resource 255, such as the first video content 252. Non-limiting examples of the video manager application 265 may include a Google Ads' video manager application, a Yandex.Direct™ video manager application, and the like.

It is not limited how the video manager application 265 can be configured to select, from the video content database 264, the second video content 262 for display thereof during the interruption of the first video content 252. For example, in some non-limiting embodiments of the present technology, the video manager application 265 may be configured to select the second video content 262 as being associated with the first video content 252 based, for example, on the items the second video content 262 is aimed at promoting. In other non-limiting embodiments of the present technology, the video manager application 265 can be configured to cause the second video content 262 to target an audience pre-determined as being interested in watching the first video content 252, based on certain parameters associated with users thereof or their electronic devices. Such parameters may include, for example, user-specific parameters further including, without limitation, socio-economical parameters of the users, such as their age, occupations, average incomes, for example; their browsing and searching histories, and the like. However, user non-specific parameters, such as a current geographical location of the electronic device 210, an operating system thereof or its brand, as an example, can also be considered when adding the second video content 262 to the first video content 252 for combined display thereof.

In yet other non-limiting embodiments of the present technology, the video manager application 265 can be configured to select the second video content 262 to be played along with the first video content 252 based on specific objectives pursued by the respective advertiser associated with the second video content 262. For example, such objectives may include maximizing traffic at a web resource of the respective advertiser, increasing public awareness of the promoted items, maximizing sales value of the promoted items, and the like.

Thus, having selected the second video content 262 to be added to the first video content 252, in some non-limiting embodiments of the present technology, the video manager application 265 can be configured to cause the browser application 215 to interrupt the display of the first video content 252, such as by putting it on pause, to display the second video content 262 For example, in some non-limiting embodiments of the present technology, the browser application 215 can be configured to put the display of the first video content 252 on pause in response to a trigger event. For example, in some non-limiting embodiments of the present technology, the trigger event can comprise receiving, at the given moment in the timeline of the first video content 252, from the video manager application 265, instructions for the browser application 215 to download and display the second video content 262. In these embodiments, the given moment in time can be predetermined, such as 25% of a whole duration of the first video content 252 or be associated with a current portion of the first video content 252, as an example. However, in other non-limiting embodiments of the present technology, the given moment may be determined by an operator of the second server 260.

Further, in some non-limiting embodiments of the present technology, the video manager application 265 can be configured to pre-select the second video content 262 for display thereof during the interruption of the first video content 252 at the given moment in time in various electronic devices (not depicted) requesting access to the given web page 302 of the given web resource 255. To that end, the video manager application 265 can be configured to transmit the instructions to download and display the second video content 262 to the server 250 before the display of the first video content 252 on the electronic device 210. The server 250 can thus be configured to embed the instructions from the video manager application 265 in the first video content 252 and further cause their automatic execution upon the display of the first video content 252 on the electronic device 210.

However, in other non-limiting embodiments of the present technology, the trigger event causing the browser application 215 to download and cause the display of the second video content 262 can comprise, without limitation, commencing the display of the first video content 252; resuming following pausing, by the user 230, the display of the first video content 252; refreshing the given web page 302 in the browser application 215; and the like.

Figure 4:
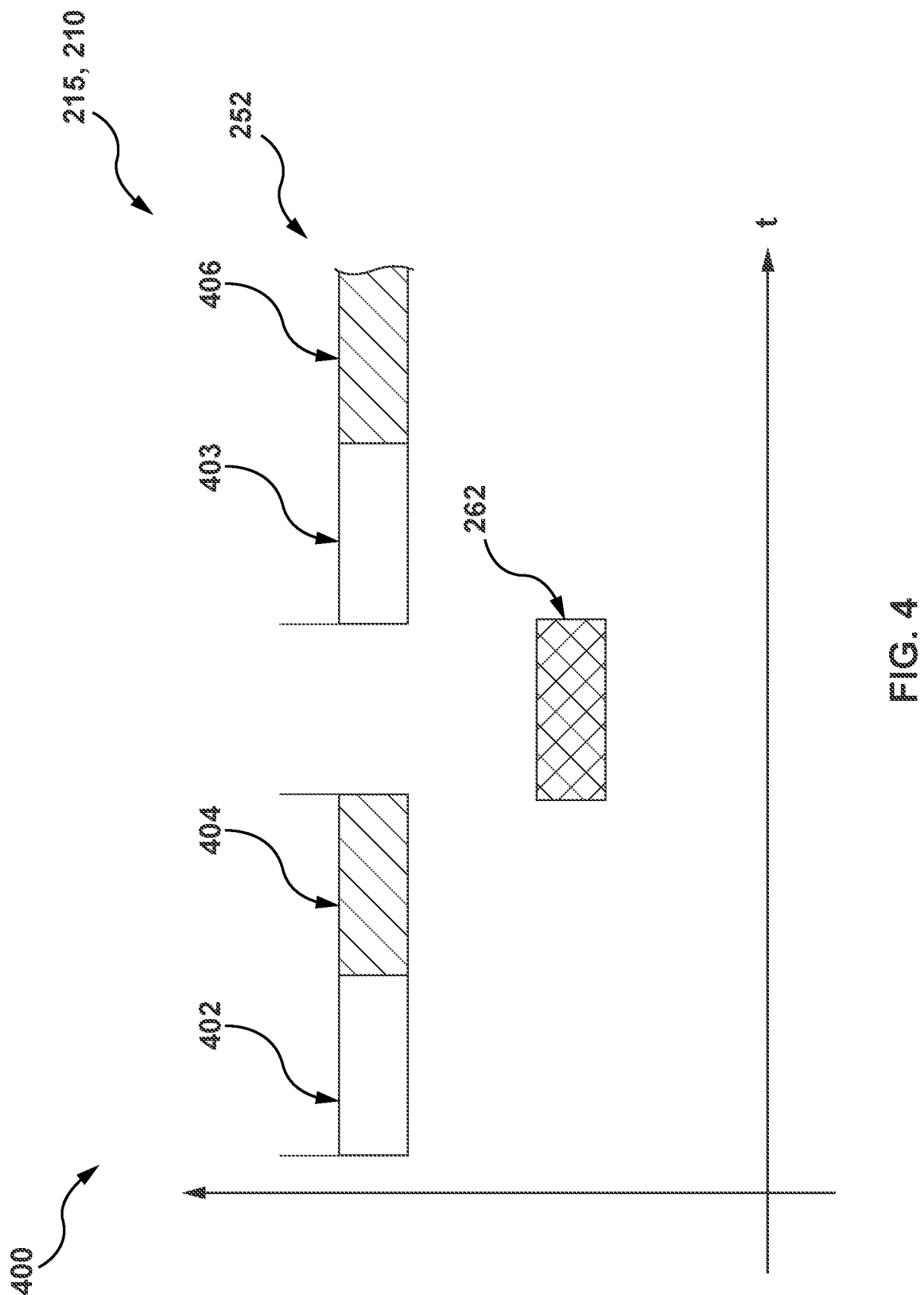
FIG. 4 depicts a time diagram of a process of displaying, in the given web page of the browser application, by the electronic device present in the networked computing environment of FIG. 2, different video contents using a single video player, in accordance with certain non-limiting embodiments of the present technology.

With reference to FIG. 4, there is depicted a first time diagram 400 of the browser application 215 causing display of the first video content 252 and the second video content 262 within the video display area 304 of the given web page 302 using the first video player 502, in accordance with certain non-limiting embodiments of the present technology.

As noted hereinabove, to load the given web page 302, the browser application 215 can be configured to receive the respective digital document representative of the given web page 302 and further execute the executable source code contained therein. Thus, having detected, in the executable source code, the video tag referencing the first video content source associated with the first video content 252, the browser application 215 can be configured to cause initialization of the first video content 252 over an initialization period 402. In accordance with certain non-limiting embodiments of the present technology, during the initialization period 402, the browser application 215 can be configured to: (1) allocate, for example, in at least one of the solid-state drive 120 and random-access memory 130 of the electronic device 210, a browser memory space for buffering first encoded video data of the first video content 252; (2) cause download, from the first video content source, such as the server 250, the first encoded video data in the browser memory space; (3) generate and cause representation, within the given web page 302, of the video display area 304 including interface elements, such as the control elements, as described above; (4) establish, using the API 506, a connection between the video tag and the first video player 502 to feed thereto the first encoded video data for decoding thereof; (5) receive, from the first video player 502, so decoded video data indicative of a given portion 404 of the first video content 252; and (6) cause display of the given portion 404 of the first video content 252 within the video display area 304.

Further, in response to the trigger event, as described above, according to certain non-limiting embodiments of the present technology, the browser application 215 can be configured to (1) interrupt the display of the first video content 252 by putting it on pause; (2) parse the executable source code associated with the given web page 302 to detect the video tag thereof; (3) cause modification of the video tag to assign to the src attribute thereof a source address of the second video content 262, such as a URL of a respective directory at the second server 260; and (4) cause the download, from the second server 260, of second encoded video data associated with the second video content 262 and further cause the display thereof, using the first video player 502, within the video display area 304 as described above with respect to the first video content 252. As it can be appreciated, the browser application 215 can be configured to cause the display of the second video content 262 following a respective initialization period, similar to the initialization period 402 associated with the first video content 252, an indication of which has been omitted in FIG. 4 for clarity of the illustrations.

Further, as described above, the browser application 215 can be configured to cause modification of the video tag, for example, by calling a respective JavaScript element, such as HTMLVideoElement configured for modifying attributes of the video tag associated with the given web page 302. For example, as mentioned above, HTMLVideoElement can be configured for modifying the src attribute of the executable source code associated with the given web page 302 specifying a source of the video content to be displayed therein.

However, once the browser application 215 has caused such a modification of the video tag, the processing of the first video content 252 for further display thereof will be aborted. More specifically, after changing the value of the src attribute, the browser application 215 can be configured to interrupt the connection with the first video player 502 and clear the browser memory space storing already downloaded first encoded video data for display of an other portion 406 of the first video content 252.

Accordingly, as further depicted in FIG. 4, to resume playing the first video content 252, such as the other portion 406 thereof, after finishing the display of the second video content 262, which may include, for example, ending of the second video content 262 and/or receiving a skipping command from the user 230, the browser application 215 can be configured to perform the initialization of the first video content 252 again, starting from a moment when the display thereof was paused for playing the second video content 262, that is, at the end of the given portion 404. This, as it can be appreciated, can require an other initialization period 403, as described above, before the other portion 406 of the first video content 252 will be ready for playing back.

Thus, according to certain non-limiting embodiments of the present technology, the other initialization period 403 may be perceived, by the user 230, as an appreciable pause caused by switching from the display of the second video content 262 back to the first video content 252, which may affect an overall user experience of the user 230 watching the first video content 252 and interacting with the given web resource 255.

Thus, developers of the present technology have devised methods and systems allowing seamless switching between the display of the second video content 262 and the first video content 252. More specifically, the developers have appreciated that the pause caused by the switching the video contents can be minimized (or even reduced to zero) if during the display of the second video content 262, the browser application 215 continues downloading the first encoded video data of the first video content 252 and does not interrupt the connection with the first video player 502 for further display thereof.

How the methods allowing seamless switching play between the second video content 262 and the first video content 252 can be implemented, in accordance with certain non-limiting embodiments of the present technology, will now be described with reference to FIGS. 5 and 6.

Communication Network

In some non-limiting embodiments of the present technology, the communication network 240 is the Internet. In alternative non-limiting embodiments of the present technology, the communication network 240 can be implemented as any suitable local area network (LAN), wide area network (WAN), a private communication network, or the like. It should be expressly understood that implementations for the communication network are for illustration purposes only. How a respective communication link (not separately numbered) between each one of the electronic device 210, the server 250, and the second server 260 and the communication network 240 is implemented will depend, inter alia, on how each one of electronic device 210, the server 250, and the second server 260 is implemented. Merely as an example and not as a limitation, in those embodiments of the present technology where the electronic device 210 is implemented as a wireless communication device such as the smartphone, the communication link can be implemented as a wireless communication link. Examples of wireless communication links include, but are not limited to, a 3G communication network link, a 4G communication network link, and the like. The communication network 240 may also use a wireless connection with the server 250, and each one of the plurality of other electronic devices.

Seamless Switching between Play of Different Video Content

With reference to FIG. 5, there is depicted a schematic diagram of a process for displaying, by the browser application 215, the first video content 252 and the second video content 262 in the given web page 302, in accordance with certain non-limiting embodiments of the present technology.

According to certain non-limiting embodiments of the present technology, for displaying each one of the first video content 252 and the second video content 262, the browser application 215 may include (or otherwise have access to) two separate video players. Thus, in these embodiments, the browser application 215 can further include (or otherwise have access to) a second video player 504 dedicated for displaying the second video content 262. As it can be appreciated, in some non-limiting embodiments of the present technology, the second video player 504 can be implemented similarly to the first video player 502, as described above with reference to FIGS. 2 and 3. For example, each one of the first video player 502 and the second video player 504 can be different instances of a video player. However, in other non-limiting embodiments of the present technology, each one of the first video player 502 and the second video player 504 can be implemented as instances of different video players, such as those provided by different multimedia frameworks, as described above, without departing from the scope of the present technology.

Thus, in accordance with certain non-limiting embodiments of the present technology, once the electronic device 210 has acquired access to the given web resource 255 and received the respective digital document representative of the given web page 302, the electronic device 210 can be configured to cause the browser application 215 to execute the executable source code associated with the given web page 302, thereby rendering the visual representation thereof and causing display, by the first video player 502, of the first video content 252 within the video display area 304, as described above.

Further, in response to receiving the trigger event, in accordance with certain non-limiting embodiments of the present technology, the browser application 215 can be configured to (1) pause the display, via the first video player 502, of the first video content 252; (2) parse the executable source code associated with the given web page 302 to detect therein the video tag; (3) call HTMLVideoElement to cause modification of the video tag by assigning to the src attribute thereof the URL of the respective directory at second server 260 that provides access to the second video content 262; (4) establish, using the API 506, a separate connection between the video tag and the second video player 504; and (5) cause the display of the second video content 262 by the second video content 262.

Accordingly, by displaying the second video content 262 by the second video player 504 via the separate connection, the browser application 215 can be configured to maintain the connection with the first video player 502, which allows the browser application 215 to continue initializing the first video content 252, that is download, in the browser memory space, the first encoded video data for further decoding and display thereof, while the second video content 262 is being displayed by the second video player 504. This may further allow resuming the display of the first video content 252, after ending the display of the second video content 262, without a pause appreciable by the user 230.

According to some non-limiting embodiments of the present technology, the ending the display of the second video content 262 can include terminating the display of the second video content 262 due to an end thereof—that is, when the second video content 262 has been fully displayed. However, in other non-limiting embodiments of the present technology, the ending the display of the second video content 262 can also include a forced termination of the display of the second video content 262 while it is being displayed—such as by the user 230 transmitting to the second server 260 a skipping request, using, for example, a respective actuator of the video display area 304, for skipping the display of the second video content 262.

Figure 6:
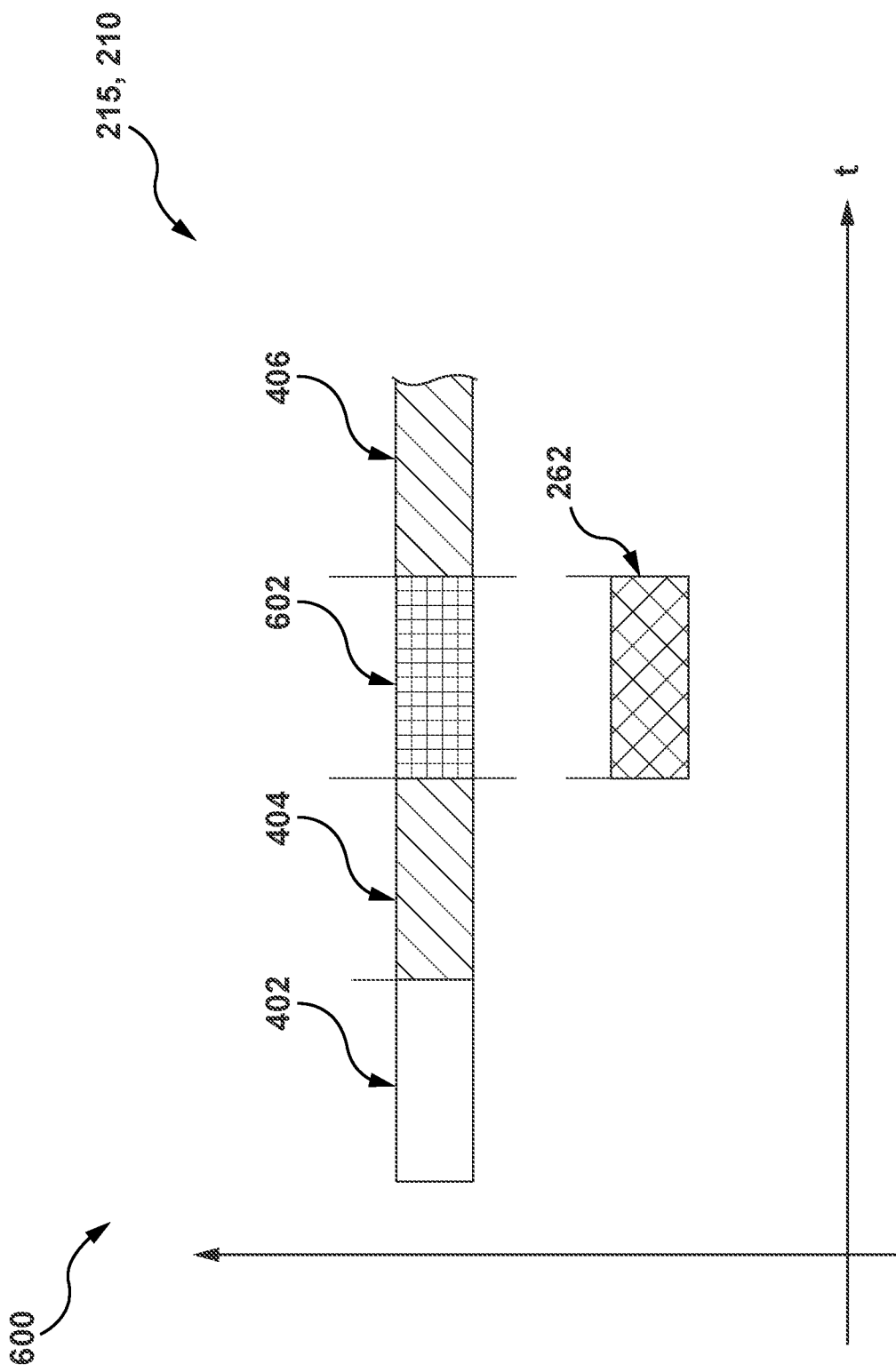
FIG. 6 depicts a time diagram of the process of FIG. 5, in accordance with certain non-limiting embodiments of the present technology.

More specifically, with reference to FIG. 6, there is depicted a second time diagram 600 of the browser application 215 causing display of the first video content 252 and the second video content 262, within the video display area 304, using the first video player 502 and the second video player 504, respectively, in accordance with certain non-limiting embodiments of the present technology.

As it can be appreciated, after the initialization period 402 and the display of the given portion 404 of the first video content 252, as described above, the browser application 215 can be configured to initialize and cause display of the second video content 262. However, unlike the case where only the first video player 502 was used, described above with reference to FIG. 4, using the second video player 504 allows the browser application 215 to cause display of the second video content 262 without losing the connection with the first video player 502, which further allows continuing buffering, in the browser memory space, the first encoded video data associated with the first video content 252 over an intermediate buffering period 602, which is equal to a duration of the display of the second video content 262. Thus, by so doing, after ending playing the second video content 262, the browser application 215 can be configured to resume the display of the first video content 252, that is, start displaying the other portion 406 thereof, without delays for the other initialization period 403, as described above.

As an example, implementation of the so described, seamless, transition between the first video content 252 and the second video content 262 by the browser application 215 using two video players can be illustrated, according to certain non-limiting embodiments of the present technology, by a following configuration of HTMLVideoElement in the executable source code associated with the given web page 302:

var video=document.querySelector("video");
    video.src='first video content source';
    video.play( );
    video.DetachPlayer( );
    video.src='second video content source';
    video.play( );
    video.ReattachPlayer( );
    video.play( );

According to the executable source code portion presented above, in response to the trigger event, using a function video.DetachPlayer( ), the browser application 215 can be configured to put the display of the first video content 252 on pause and detach the first video player 502 from the video tag associated with the given web page 302 so as to begin to display the second video content 262 by the second video player 504 while continuing buffering, in the browser memory space, the first encoded video data associated with the first video content 252. Further, after finishing playing the second video content 262, using a function video.ReattachPlayer( ), the browser application 215 can be configured to reattach, using the API 506, the first video player 502 to the video tag for decoding the so buffered first encoded video data and thus resuming display of the first video content 252.

Accordingly, by using dedicated video players, the browser application 215 of the electronic device 210 can be configured to minimize or even eliminate the delays caused by switching between the display the second video content 262 and the first video content 252, which may thus improve the user experience of the user 230 watching the video content online.

Method

Figure 7:
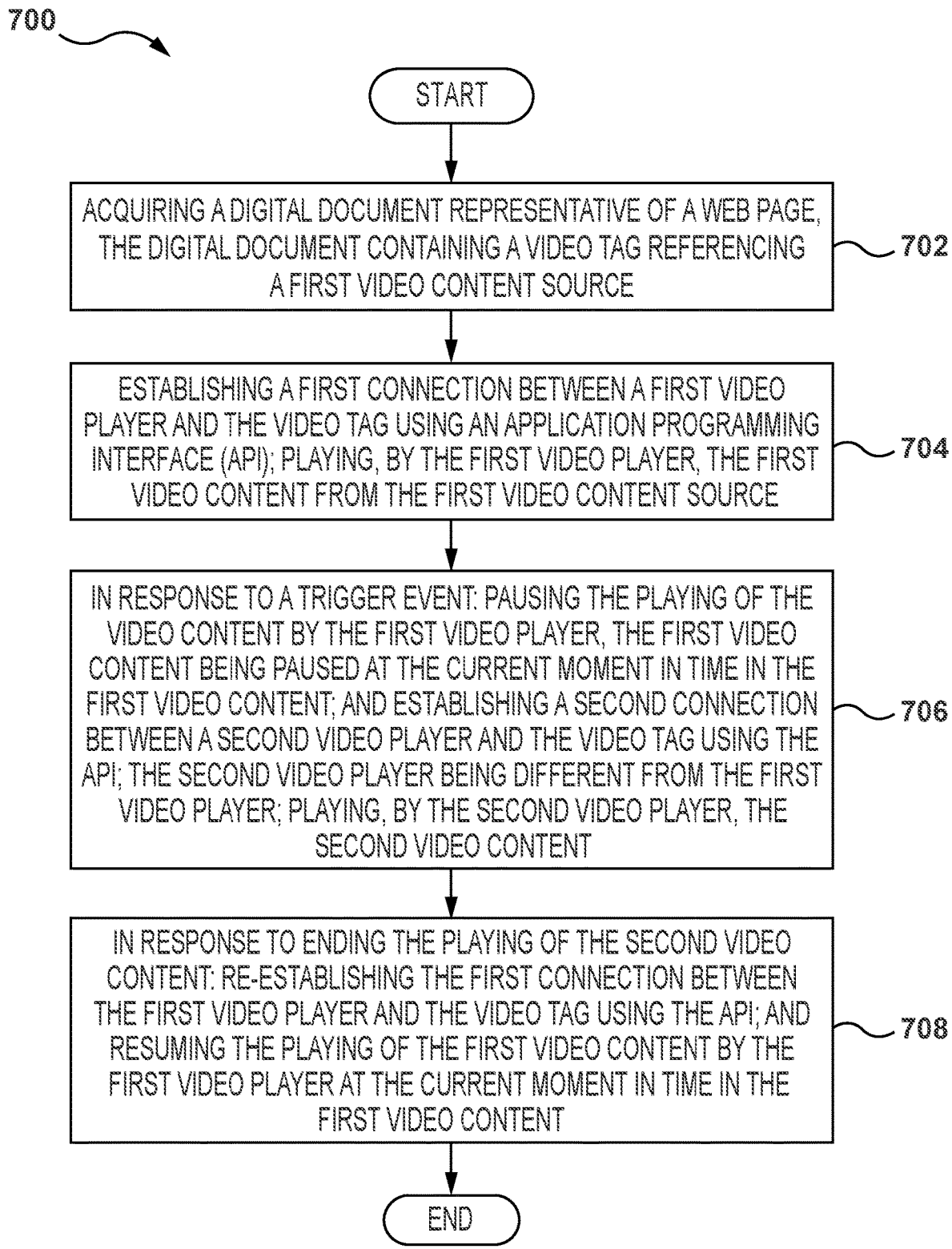
FIG. 7 depicts a flowchart diagram of a method for switching play, in the given web page of the browser application, by the electronic device present in the networked computing environment of FIG. 2, between the different video contents, in accordance with certain non-limiting embodiments of the present technology.

Given the architecture and the examples provided hereinabove, it is possible to execute a method for switching play between two different video content, such as the first video content 252 and the second video content 262, as described above. With reference now to FIG. 7, there is depicted a flowchart of a method 700, according to the non-limiting embodiments of the present technology. The method 700 may be executed by the processor 110 of the electronic device 210. As noted above, the electronic device 210 can be configured to execute the browser application 215, via which the processor 110 can be configured to execute the method 700.

Step 702: Acquiring a Digital Document Representative of a Web Page, the Digital Document Containing a Video Tag Referencing a First Video Content Source The method 700 commences at step 702 with the processor 110 being configured to cause the browser application 215 to receive a respective digital document representative of a web page, such as that of the given web page 302 of the given web resource 255 depicted in FIG. 3. The respective digital document may include the executable source code (developed, for example, in the HTML, as mentioned above), upon execution of which, the browser application 215 can be configured to render the visual representation of the given web page 302.

As mentioned above, in some non-limiting embodiments of the present technology, the browser application 215 can be caused to receive the respective digital document from the server 250 hosting the given web resource 255 in response to the user 230 submitting the respective URL of the given web page 302 to the address bar (not separately labelled) of the browser application 215.

Further, the given web resource 255 can contain certain video content, such as the first video content 252 for display thereof in the video display area 304 of the given web page 302. To that end, in accordance with certain non-limiting embodiments of the present technology, the executable source code associated with the given web page 302 may include a video tag referencing, via the src attribute, the given web resource 255 as the first video content source of the first video content 252. For example, the video tag of the executable source code associated with the given web page 302 developed in the HTML, can look as follows:

```
<html>
  [...]
  <body>
    [....]
      <video src="first video content source" autoplay controls></video>
    [...]
  </body>
  [...]
</html>
```

The method 700 thus advances to step 704.

Step 704: Establishing a First Connection Between a First Video Player and the Video Tag Using an Application Programming Interface (API); Playing, by the First Video Player, the First Video Content from the First Video Content Source At step 704, in accordance with certain non-limiting embodiments of the present technology, the processor 110 can be configured to cause the browser application 215 to display the first video content 252 within the video display area 304 of the given web page 302. For example, if the video tag of the given web page has a configuration provided in the example above, the browser application 215 can be caused to play the first video content 252 automatically after loading the given web page 302. In another example, the browser application 215 can be caused to play the first video content 252 in response to a user input of the user 230—such as actuating a respective actuator ("Play", and the like, not separately labelled in FIG. 3) within the video display area 304 of the given web page 302.

Further, as mentioned above, to display the first video content 252, the browser application 215 may be configured to establish a connection with a video player, such as the first video player 502 described above with reference to FIGS. 3 and 5. To that end, the browser application 215 can have access to an API, such as the API 506 described above.

As noted further above, in some non-limiting embodiments of the present technology, the API 506 can be provided by the same entity providing the first video player 502. Further, in some non-limiting embodiments of the present technology, the API 506 can be a single API used by the browser application 215 for causing display of video content via the first video player 502. However, in other non-limiting embodiments of the present technology, the browser application 215 can be configured to use different APIs for displaying different video content, for example, that received from different sources.

In sum, as described in detail above with reference to FIGS. 4 and 6, having detected in the respective digital document associated with the given web page 302 the video tag referencing the first video content source, the browser application 215 can be configured to cause initialization of the first video content 252 over the initialization period 402. In accordance with certain non-limiting embodiments of the present technology, during the initialization period 402, the browser application 215 can be configured to: (1) allocate, for example, in at least one of the solid-state drive 120 and random-access memory 130 of the electronic device 210, the browser memory space for buffering the first encoded video data of the first video content 252; (2) cause download, from the first video content source, that is, the server 250, the first encoded video data in the browser memory space; (3) generate and cause representation, within the given web page 302, of the video display area 304 including the interface element; (4) establish, using the API 506, the connection between the video tag and the first video player 502 to feed thereto the first encoded video data for decoding thereof; (5) receive, from the first video player 502, so decoded video data indicative of the given portion 404 of the first video content 252; and (6) cause display of the given portion 404 of the first video content 252 within the video display area 304.

The method 700 thus proceeds to step 706.

Step 706: In Response to a Trigger Event: Pausing the Playing of the First Video Content by the First Video Player, the First Video Content being Paused at a Current Moment in Time in the First Video Content; and Establishing a Second Connection Between a Second Video Player and the Video Tag Using the API; the Second Video Player being Different from the First Video Player; Playing, by the Second Video Player, the Second Video Content At step 706, the processor 110 can be configured to receive, form the second server 260, an indication of the trigger event, and responsive thereto cause the display of the second video content 262 provided by the second server 260 within the video display area 304 of the given web page 302, as described above.

As noted above, in some non-limiting embodiments of the present technology, the trigger event can comprise, without limitation, commencing the display of the first video content 252; resuming following pausing, by the user 230, the display of the first video content 252; refreshing the given web page 302 in the browser application 215; and the like.

Thus, as described with reference to FIG. 6, in response to the trigger event, in some non-limiting embodiments of the present technology, the processor 110 can be configured to receive, from the video manager application 265 running on the second server 260, instructions causing the browser application 215 to (1) pause the display, via the first video player 502, of the first video content 252, such as after playing the given portion 404 thereof; (2) parse the executable source code associated with the given web page 302 to detect therein the video tag; (3) modify the video tag to reference the second video content source associated with the second video content 262, thereby detaching the first video player 502 from the video tag; (4) establish, using the API 506, a separate connection between the video tag and the second video player 504; and (5) cause the display of the second video content 262 by the second video player 504.

The second video player 504 can be different from the first video player 502; however, implemented similarly thereto. For example, each one of the first video player 502 and the second video player 504 can be different instances of a given video player. In another example, each one of the first video player 502 and the second video player 504 can be implemented as instances of different video players, such as those provided by different multimedia frameworks, as described above, without departing from the scope of the present technology.

As noted further above, the processor 110 can be configured to cause modifying the video tag by calling HTMLVideoElement of a JavaScript portion of the executable source code associated with the given web page 302. More specifically, via the HTMLVideoElement, the processor 110 can be configured to assign to the src attribute of the video tag the URL of the respective directory at the second server 260 that provides access to the second video content 262. By doing so, the browser application can be configured to detach the first video player 502 from the video tag and attach thereto the second video player 504. To do so, in some non-limiting embodiments of the present technology, the processor 110 can be configured to apply the function video.DetachPlayer( ) in the executable source code associated with the given web page 302, as described above.

Thus, according to certain non-limiting embodiments of the present technology, the browser application 215 can be configured to establish separate connections between the video tag and each one of the first video player 502 and the second video player 504 for displaying the first video content 252 and the second video content 262, respectively. As described further above with reference to FIG. 6, this allows the browser application 215, while causing the display of the second video content 262 via the second video player 504 during the intermediate buffering period 602, to continue buffering the first encoded video data associated with the first video content 252 in the browser memory space.

The method 700 thus proceeds to step 708.

Step-708: In Response to Ending the Playing of the Second Video Content: Re-Establishing the First Connection Between the First Video Player and the Video Tag Using the API; and Resuming the Playing of the First Video Content by the First Video Player at the Current Moment in Time in the First Video Content Thus, at step 708, upon the end of the display of the second video content 262, the processor 110 can be configured to cause the browser application 215 to re-establish the connection between the first video player 502 and the video tag so as to resume the display, via the video display area 304 of the given web page 302, of the first video content 252, that is, start displaying the other portion 406 thereof so buffered during the display of the second video content 262, during the intermediate buffering period 602 as described further above with reference to FIG. 6. In some non-limiting embodiments of the present technology, to re-establish the connection with the first video player 502, the processor 110 can be configured to apply the function video.ReattachPlayer( ) in the executable source code associated with the given web page 302, as described above.

As noted hereinabove, according to certain non-limiting embodiments of the present technology, the processor 110 can be configured to resume the display of the first video content 252 via the first video player 502 in response to one of (i) the end of the second video content 262 and (ii) the forced termination of the display thereof, such as in response to the user 230 submitting the skipping request, to the second server 260, using the respective actuator in the video display area 304 while the second video content 262 is being displayed therein.

Thus, as opposed to the conventional approach of switching video contents described above with reference to FIG. 4, the method 700 allows resuming the display of the first video content 252 without the need of the other initialization period 403. More specifically, using the separate video players for displaying each one of the first video content 252 and the second video content 262 allows the browser application 215 to continue buffering, from the first video content source, the first encoded video data associated with the first video content 252 while displaying the second video content 262 via the second video player 504. This thus allows minimizing or even eliminating the pauses caused by switching between the display the second video content 262 and the first video content 252, which may thus improve the user experience of the user 230 watching the video content online.

The method 700 thus terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method of switching play between a first video content and a second video content, the method being executable by an electronic device running a browser application, the method comprising:
    acquiring a digital document representative of a web page, the digital document containing a video tag referencing a first video content source;
    establishing a first connection between a first video player and the video tag using an Application Programming Interface (API);
    playing, by the first video player, the first video content from the first video content source;
    in response to a trigger event:
        pausing the playing of the first video content by the first video player, the first video content being paused at a current moment in time in the first video content;
        modifying the video tag to reference a second video content source associated with the second video content;
        establishing a second connection between a second video player and the video tag using the API,
            the second video player being different from the first video player; and
        playing, by the second video player, the second video content; and
    in response to ending the playing of the second video content:
        re-establishing the first connection between the first video player and the video tag using the API; and
        resuming the playing of the first video content by the first video player at the current moment in time in the first video content.

2. The method of claim 1, wherein the resuming is executed without an appreciable pause to a user.

3. The method of claim 1, wherein the method comprises parsing the digital document for detecting the video tag.

4. The method of claim 1, wherein the method further comprises:
    downloading first encoded video content from the first video content source; and
    decoding, by the first video player, the first encoded video content into the first video content.

5. The method of claim 4, wherein the method further comprises:
    continuing the downloading and the decoding of the first encoded video content during the playing of the second video content.

6. The method of claim 1, wherein the trigger event corresponds to the browser application receiving a command for triggering the playing of the second video content.

7. The method of claim 6, wherein the command is embedded in the first video content.

8. The method of claim 1, wherein the browser application has a browser memory, and wherein the method further comprises:
    storing in the browser memory the first video content during the playing of the second video content.

9. The method of claim 1, wherein the API is a single API for establishing both the first connection and the second connection.

10. The method of claim 1, wherein the API is provided by an operating system run on the electronic device.

11. An electronic device for switching play between a first video content and a second video content in a web page of a browser application of the electronic device, the electronic device comprising:
    at least one processor;
    at least one non-transitory computer-readable medium storing instructions, and
    the at least one processor, upon executing the instructions, causing the electronic device to:
        acquire a digital document representative of the web page, the digital document containing a video tag referencing a first video content source;
        establish a first connection between a first video player and the video tag using an Application Programming Interface (API);
        play, by the first video player, the first video content from the first video content source;

in response to a trigger event:
pause the playing of the first video content by the first video player, the first video content being paused at a current moment in time in the first video content;
modify the video tag to reference a second video content source associated with the second video content;
establish a second connection between a second video player and the video tag using the API,
the second video player being different from the first video player; and
play, by the second video player, the second video content; and
in response to ending the playing of the second video content:
re-establish the first connection between the first video player and the video tag using the API; and
resume the playing of the first video content by the first video player at the current moment in time in the first video content.

12. The electronic device of claim 11, wherein the instructions, when executed by the at least one processor, cause the electronic device to resume the playing of the first video content without an appreciable pause to a user.

13. The electronic device of claim 11, wherein the instructions that cause the electronic device to detect the video tag, comprise instructions that cause the electronic device to parse the digital document.

14. The electronic device of claim 11, wherein the instructions, when executed by the at least one processor, further cause the electronic device to:
download first encoded video content from the first video content source; and
decode, by the first video player, the first encoded video content into the first video content.

15. The electronic device of claim 14, wherein the instructions, when executed by the at least one processor, further cause the electronic device to:
continue downloading and decoding the first encoded video content during the playing of the second video content.

16. The electronic device of claim 11, wherein the trigger event corresponds to the browser application receiving a command for triggering the playing of the second video content.

17. The electronic device of claim 11, wherein the browser application has a browser memory, and wherein the instructions, when executed by the at least one processor, further cause the electronic device to:
store, in the browser memory, the first video content during the playing of the second video content.

18. The electronic device of claim 11, wherein the instructions cause the electronic device to establish both the first connection and the second connection using a single API.

19. A non-transitory computer-readable medium comprising executable instructions which, when executed by at least one processor, cause the at least one processor to:
acquire a digital document representative of a web page, the digital document containing a video tag referencing a first video content source;
establish a first connection between a first video player and the video tag using an Application Programming Interface (API);
play, by the first video player, first video content from the first video content source;
in response to a trigger event:
pause the playing of the first video content by the first video player, the first video content being paused at a current moment in time in the first video content,
modify the video tag to reference a second video content source associated with a second video content,
establish a second connection between a second video player and the video tag using the API, the second video player being different from the first video player, and
play, by the second video player, the second video content; and
in response to ending the playing of the second video content:
re-establish the first connection between the first video player and the video tag using the API, and
resume the playing of the first video content by the first video player at the current moment in time in the first video content.

* * * * *